March 9, 1943.   E. H. STEEDMAN   2,313,681
RECOVERY OF LIQUID HYDROCARBONS FROM WELL FLUIDS
Filed Aug. 9, 1940
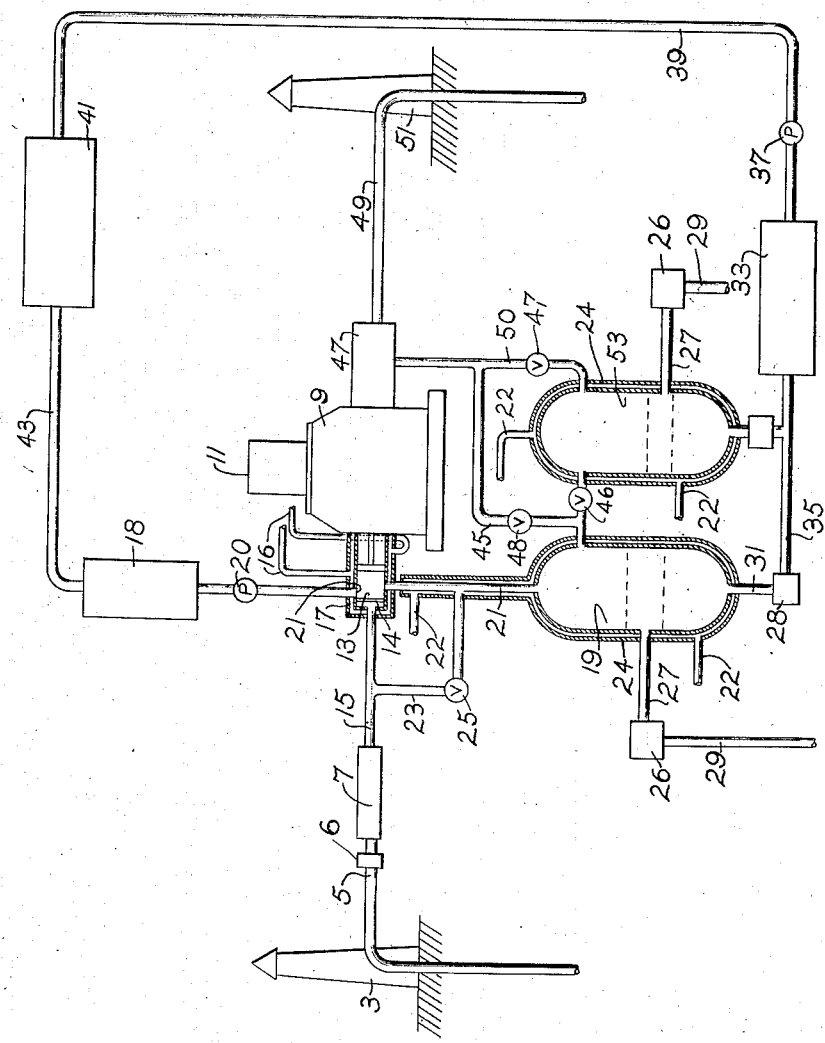
INVENTOR:
EDWIN H. STEEDMAN
BY
Roy M. Eilers
ATTORNEYS.

Patented Mar. 9, 1943

2,313,681

UNITED STATES PATENT OFFICE 2,313,681

RECOVERY OF LIQUID HYDROCARBONS FROM WELL FLUIDS

Edwin H. Steedman, St. Louis, Mo.

Application August 9, 1940, Serial No. 351,988

2 Claims. (Cl. 62—123)

This invention relates to the extraction of petroleum products from natural gas and the return of the denuded gas to the field.

Throughout many of the oil and gas fields of the country, gas under pressure, containing certain hydrocarbon liquids, is available where the liquid hydrocarbons may be recovered from this gas by retrograde condensation; that is, by reducing the pressure and/or properly controlling the temperature of the gas within the retrograde condensation range. It has been found that, if the gas is taken without restriction from a field, the pressure in the field soon falls to such an extent as to cause condensation of the liquid hydrocarbons in the structure of the field itself. This seriously diminishes and eventually prevents further recovery from the field.

It has likewise been found that in many oil fields where gas is allowed to escape unrestricted, the pressure in the field drops to such an extent that sooner or later lifting means must be employed to raise the oil. The flow from the field is often seriously reduced. Many oil and gas fields, therefore, are being equipped to extract the liquid hydrocarbons from the gas by retrograde condensation and to return the denuded gas under pressure to the field. Such a procedure materially increases the total field oil production and produces liquid hydrocarbons not heretofore available.

The compression of the gas for returning to the field requires both large equipment and heavy expenditures of power. It is an object of this invention to provide means to extract the liquid hydrocarbons and return the gas to the field, which will require less power, as well as a smaller outlay for equipment than formerly necessary, as well as to increase the recovery of the liquid hydrocarbons. I accomplish this result by allowing the high pressure gas to perform work which is useful in the compression process and, at the same time, to refrigerate itself. The refrigeration of the gas increases the recovery of liquid from the gas, allows condensation at higher pressure thus reducing the amount of compression necessary and reduces the capacity of compressor and the power required to return the denuded gas to the field. The cost of refrigeration is saved since the expansion of the gas itself is used for this purpose.

I use the heat produced at the compressor and its driving engine to prevent freezing and control temperatures at certain points in the system where heat is needed. By the use of a suitably treated fluid which may be injected into the cylinder where the gas performs useful work on a piston, I am able to recover power more efficiently from the gas and to prevent freezing and sticking of the piston.

Further objects and advantages will appear from the following detailed description and accompanying drawing in which I show one embodiment of my invention.

The figure is a schematic view of my system as applied in one form.

Referring now to the drawing, 3 is a well supplying the gas which is to be processed. 5 is a line connecting the well with a dehydrating device 7. This device may be of any form suitable for the purpose as, for instance, the type employing refrigeration to cool the gas and cause the water vapor to condense out. The gas may thus be dehydrated if necessary before further treatment to prevent the water vapor from changing to ice on subsequent cooling of the gas. 9 is a compressor for recompressing the gas after the extraction of the condensate therefrom, and returning it to the field to maintain the field pressure. Maintaining the field pressure prevents condensation of the hydrocarbons in the sand of the field and insures a greater total oil or gas supply as previously set forth.

Part of the power for driving the compressor may be supplied by a suitable means, such as an internal combustion gas engine provided with power cylinders 11. Cylinders 13 may also be connected with the compressor to supply power thereto. Power in these cylinders may be derived from the pressure of the gas, as delivered by line 15 from the dehydrator 7. Cylinder 13 may be supplied with gas during the full stroke of the piston, or the intake valves may be closed at any desirable point to allow the gas in the cylinder to expand any desired amount. The expansion of the gas in the cylinder 13 will refrigerate the gas and lower its temperature to the desired point. If the gas is not allowed to expand in the cylinder, it will be cooled by its expansion as it passes through the exhaust ports. If this should not provide enough cooling, an additional expansion means may, of course, be used. The cylinder 13 may be provided with an adjustable head 14 to vary the clearance, and thus the volume of the cylinder. The cylinder 13 may be provided with a jacket 17 supplied with lines 16 to introduce a heating fluid for circulation. The heat for the heating fluid may be obtained from the cooling system of the internal combustion engine 11 or the compressor 9. The exhaust of the engine 11 may also be used to furnish heat to parts of the system, if a larger amount of heat is required. The heating fluid circulating in jacket 17 will prevent the formation of ice on the interior surface of cylinder 13 and may also be utilized to control to some extent the temperature of the gas within the cylinder 13. It may be desired to inject a brine or liquid mixture into the cylinder along with the gas to prevent the formation of ice and corrosion on the cylinder walls. This brine or liquid may be pumped from a reservoir 18 by a high pressure pump 20 and introduced through opening 21. It may contain some lubricating or anti-corrosion agent, as well as an anti-freeze.

The gas discharged from the cylinder 13 enters the separator 19, where the pressure is less than in line 15, via line 21. This line may be jacketed, if desired, for temperature control. A bypass line 23 around cylinder 13 with valve 25 may be provided. This bypass allows closer control of the temperature and pressure of the gas entering the separator 19. The separator 19 may be provided with a jacket 24 to allow the circulation of a tempering fluid therearound. The tempering fluid may enter and leave the heat jacket by lines 22. This provides another means for controlling the temperature in the separator. Thus the condition of the gas in the separator can be controlled by: the preliminary cooling, expansion, and dehydration before it is admitted to cylinder 13, the clearance in cylinder 13, the cut-off in cylinder 13, the temperature of the walls of cylinder 13, and by the amount and temperature of the brine or other substance injected into cylinder 13. Separator 19 is used in connection with conventional traps 26 and 28 for removing the condensate and brine from the separator. The hydrocarbon condensate is taken to trap 26 by line 27 and from trap 26 to suitable storage tanks or to apparatus for further treatment by line 29. The brine which was introduced may be taken off through line 31 to trap 28 and to storage tank 33 by a line 35. The brine may be accumulated in tank 33 and moved by pump 37 through line 39 to a conditioner 41. It then passes through line 43 to the storage tank 18. Conditioner 41 may be used to control the temperature of the brine and may be arranged to obtain heat from the compressor or the internal combustion engine 11. The conditioner may also be arranged to extract water from the brine as well as to extract or add other substances found desirable. The gas is passed from separator 19 through line 45 to compression cylinder 47 where it is compressed to the proper pressure and returned to the well 51 through line 49 and thence into the field. The compression cylinder 47 may be provided with a variable clearance so that the volume or pressure of the return gas may be varied. It may be desirable in some instances to provide an additional separator or separators which may be connected in series with separator 19 as is separator 53 in the drawing. This separator may be provided with jackets and traps similar to those used in connection with separator 19. When separator 53 is to be used, valves 46 and 47 are opened and valve 48 closed. The denuded gas will return to the compressor through the upper part of line 50. If the separator 53 is not to be used, valves 46 and 47 must be closed and valve 48 opened. Of course, the entire separator 53 and its connections may be omitted under certain conditions. The condition of the gas in the second separator may be controlled in relation to its condition in the first separator by the degree of expansion through valve 46 from the first to the second separator and by the temperature of the jacket surrounding the second separator. In either separator, liquid hydrocarbons or other liquid may be sprayed to facilitate condensation.

It can be seen that heat is available for supply to any part of the system from the internal combustion engine and the compressor cylinders. Thus heating fluid for lines 16 and 22 may be obtained from a heat interchanger connected with these parts. The cold gas, before being admitted to the compressor cylinders, may be utilized for extracting heat from any part of the system. In some cases, it may be necessary to reduce the pressure of the gas to some extent in the usual manner before admitting it to the cylinder 13 by a conventional oriface or expansion valve at 6. Of course, the various temperatures and pressures used in the various stages of the process will be determined by the pressure, temperature, retrograde condensation range, and other characteristics of the gas being treated.

In operation, the gas from the well passes through the dehydrator 7 to have the water removed therefrom. It then passes into cylinder 13, where it works against the piston to supply power to the compressor 9. If the cut-off is arranged to allow expansion in the cylinder, this expansion will cause the gas to be cooled while in the cylinder. As the gas is discharged from the cylinder through the exhaust ports, it will further expand and cool itself. Because of the low temperatures, it may be necessary to supply heat to the cylinder by means of the heat jacket shown to prevent formation of ice within the cylinder. Brine to prevent formation of ice in conjunction with other substances for lubrication and the prevention of corrosion, may be introduced through opening 21. It is possible, of course, to use only one or both of these expedients as conditions may require. The hydrocarbon condensate and brine are separated in the separator and the brine or treating fluid is returned through conventional trap 28 by pump 37 to the storage tank 18, while the liquid condensate flows to a storage tank through trap 26 and line 29. If the brine or other fluid is to be heated and dehydrated, the conditioner or heat exchanger 41 performs this work; the heat used in the heat exchanger 41 may be supplied from engine 11 or compressor 47. The gas which has been cooled considerably is then returned to the compressor where its pressure is increased to that necessary to return it to the field. If the second separator is used, the gas will pass into separator 53, and out of line 50. The condensate may be removed through line 27 and trap 26, while any brine will leave through trap 31.

The advantages of a cooled gas have, of course, been previously realized where separate refrigeration systems have been used. With the system just described, however, it is not necessary to employ a separate refrigeration system as the gas itself not only supplies work to the system, but provides refrigeration. This considerably reduces the operating cost of the system and increases the capacity of a particular size of equipment.

While the expansion of the gas in a working cylinder refrigerates the gas, it also introduces the possibility of ice formations within the cylinder. This is avoided by using an anti-freeze brine or other substance, either with or without a heating jacket around the cylinder and other parts of the system. My apparatus makes it possible to use the retrograde condensation system much more economically than has hitherto been possible, and will make available gas from fields which could not be processed profitably with the conventional equipment now in use.

My system provides for preliminary expansion and dehydration of the gas before admission to cylinder 13, and the possibility of retreating or heating the gas after dehydration before admission to the cylinder or bypassing through valve 25. The condition of the gas in the various stages of the system may be varied by the adjustable clearance in cylinder 13, the adjustable cutoff of cylinder 13, temperature control of the walls of the cylinder 13, the amount and temperature of the brine and other substances injected in cylinder 13, the pressure maintained in separator 19, the temperature of the walls of the separator 19, the amount and temperature of the gas bypassed through line 23, the expansion of the gas from the separator 19 into the secondary separator or separators 53, and by controlling the volume of gas taken into compressor cylinder 47 by proper proportioning of the size of cylinder 47 and by using the adjustable clearance. Of course, any of the above adjustments would vary if the gas, before entering the compression cylinder 47, was used for cooling other parts of the system. It is obvious that, by adjustment of any of these elements, the pressures and temperatures for efficient production may be secured.

I have shown the cylinders 47, 13, and 11 diagrammatically as if they were all connected to the same crankshaft. It is, of course, possible to have cylinders 13 and 11 connected to generators and cylinders 47 driven by a motor connected to said generators. Such connection may be desirable under some circumstances. It may be desirable under some circumstances to utilize the power made available by the high pressure gas for other purposes than operating the compressor. Under some conditions, it is desirable to flow the high pressure gas or part of it to another field in need of repressuring rather than to return all of the high pressure gas to its own field.

I claim as my invention:

1. In an apparatus for extracting petroleum products from natural gas by retrograde condensation, a pre-cooler that at least partially dehydrates the natural gas from which the petroleum products are to be extracted, an expansion chamber which has means associated therewith to add heat to the contents of the chamber, said chamber being arranged to allow expansion of the natural gas in such a manner that the expansion of the gas will cause a refrigerating of the gas and will produce useful work, a by-pass around the said expansion chamber that is adapted to regulate the amount of natural gas flowing into the expansion chamber and thereby regulate the amount of refrigerating done in the chamber, a compressor for returning the denuded natural gas to the field, and driving means for the said compressor that utilizes the useful work produced by the expansion of the natural gas, said apparatus being arranged so the amount of pre-cooling of the gas, the amount of refrigerating done in the expansion chamber, and the amount of heat added to the expansion chamber can be regulated to prevent freezing or icing in the expansion chamber.

2. In an apparatus for extracting petroleum products from natural gas by retrograde condensation, a pre-cooler that reduces the temperature of the natural gas containing the petroleum products, an expansion chamber having means associated therewith to add heat to the contents of the chamber, said chamber being arranged to allow such an expansion of the natural gas that the gas is cooled and useful work is produced by the gas, means to regulate the flow of gas into the expansion chamber whereby the amount of cooling and the amount of work is regulated, a compressor for returning the denuded gas to the field, driving means adapted to expend work on the compressor, and means to transmit the heat from this expenditure of work to the expansion chamber, said apparatus being arranged so the pre-cooling of the gas, the refrigeration done in the expansion chamber, and the amount of heat added to the expansion chamber can be regulated to prevent freezing or icing in the expansion chamber.

EDWIN H. STEEDMAN.